United States Patent
Kuperman et al.

(10) Patent No.: US 11,394,687 B2
(45) Date of Patent: Jul. 19, 2022

(54) FULLY QUALIFIED DOMAIN NAME (FQDN) DETERMINATION

(71) Applicant: Cujo LLC, El Segundo, CA (US)

(72) Inventors: Leonid Kuperman, Los Angeles, CA (US); Santeri Kangas, Kirkkonummi (FI)

(73) Assignee: Cujo LLC, Walnut, CA (US)

( * ) Notice: Subject to any disclaimer, the term of this patent is extended or adjusted under 35 U.S.C. 154(b) by 0 days.

(21) Appl. No.: 17/010,472

(22) Filed: Sep. 2, 2020

(65) Prior Publication Data

US 2021/0084008 A1 Mar. 18, 2021

Related U.S. Application Data

(60) Provisional application No. 62/979,207, filed on Feb. 20, 2020, provisional application No. 62/895,893, filed on Sep. 4, 2019.

(51) Int. Cl.
| | |
|---|---|
| *H04L 61/3015* | (2022.01) |
| *G06N 20/00* | (2019.01) |
| *G06N 7/00* | (2006.01) |
| *H04L 61/4511* | (2022.01) |
| *H04L 61/5007* | (2022.01) |

(52) U.S. Cl.
CPC ......... *H04L 61/3015* (2013.01); *G06N 7/005* (2013.01); *G06N 20/00* (2019.01); *H04L 61/1511* (2013.01); *H04L 61/2007* (2013.01)

(58) Field of Classification Search
CPC . H04L 61/1511; H04L 61/3015; G06N 7/005; G06N 20/00
See application file for complete search history.

(56) References Cited

U.S. PATENT DOCUMENTS

| | | | |
|---|---|---|---|
| 8,645,362 B1 * | 2/2014 | Jain | G06F 16/24578 707/723 |
| 2021/0051107 A1 * | 2/2021 | Komai | H04L 41/142 |

OTHER PUBLICATIONS

Gong, X. et al., "Fingerprinting Websites Using Remote Traffic Analysis," CCS '10: Proceedings of the 17th ACM Conference on Computer and Communications Security, Oct. 4-8, 2010, Chicago, Illinois, USA, ACM, pp. 684-686.

Liberatore, M. et al., "Inferring the Source of Encrypted HTTP Connections," CCS '06: Proceedings of the 13th ACM conference on Computer and Communications Security, Oct. 30-Nov. 3, 2006, Alexandria, VA, USA, ACM, pp. 255-263.

(Continued)

*Primary Examiner* — William G Trost, IV
*Assistant Examiner* — Christopher P Cadorna
(74) *Attorney, Agent, or Firm* — Dority & Manning, P.A.

(57) ABSTRACT

Fully qualified domain name determination is disclosed. A queue of fully qualified domain names (FQDN) is created using a predetermined amount of network domains. Each FQDN is crawled from a plurality of collection agents of a computer network. For each FQDN, data comprising an Internet Protocol (IP) address of the FQDN, IP addresses for resources loaded for the FQDN and load times of the resources loaded for the FQDN are extracted. A correlation model is generated based on the data. An FQDN being accessed by one or more computer devices of the computer network is determined by using the correlation model.

20 Claims, 3 Drawing Sheets

200 CREATE QUEUE OF FULLY QUALIFIED DOMAIN NAMES (FQDN) USING PREDETERMINED AMOUNT OF NETWORK DOMAINS

201 CRAWL EACH FQDN FROM A PLURALITY OF COLLECTION AGENTS OF THE COMPUTER NETWORK

202 EXTRACT, FOR EACH FQDN, DATA COMPRISING AN IP ADDRESS OF THE FQDN, IP ADDRESSES, LOAD TIMES OF RESOURCES LOADED FOR THE FQDN (AND RESPONSE DOWNLOADED BYTES SIZE)

203 GENERATE A CORRELATION MODEL BASED ON THE EXTRACTED DATA

204 DETERMINE AN FQDN BEING ACCESSED BY ONE OR MORE COMPUTER DEVICES OF THE COMPUTER NETWORK BY USING THE GENERATED CORRELATION MODEL

(56) References Cited

OTHER PUBLICATIONS

Moriarty, K. et al., "Effects of Pervasive Encryption on Operators," Internet Engineering Task Force (IETF), Jul. 2018, 53 pages.
Wang, Tao, "Website Fingerprinting: Attacks and Defenses," A thesis presented to the University of Waterloo in fulfillment of the thesis requirement for the degree of Doctor of Philosophy in Computer Science, Waterloo, Ontario, Canada, 2015, 202 pages.
Extended European Search Report for European Patent Application No. 20194739.7, dated Jan. 15, 2021, 10 pages.

* cited by examiner

FULLY QUALIFIED DOMAIN NAME (FQDN) DETERMINATION

TECHNICAL FIELD

The present application relates generally to network security, and specifically to determining fully qualified domain names (FQDN) in a computer network.

BACKGROUND

A fully qualified domain name (FQDN) is a complete domain name for a specific computer device, or host, on the Internet. FQDN enables each network entity connected to the Internet to be uniquely identified and located in the network. This is useful in many ways such as, for example, to provide security, parental control and privacy services, maintenance of the network and managing subscribers to the network.

SUMMARY

According to an aspect of the invention there is provided a method as specified in claim 1.

According to other aspect of the invention, there is provided an apparatus in a computer network system as specified in claim 14.

According to other aspect of the invention, there is provided a non-transitory computer-readable medium comprising stored program code, the program code comprised of computer-executable instructions that, when executed by a processor, causes the processor to operate as specified in claim 20.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

The figures and the following description relate to the example embodiments by way of illustration only. Alternative embodiments of the structures and methods disclosed herein will be readily recognized as viable alternatives that may be employed without departing from the principles of what is claimed.

A fully qualified domain name (FQDN) is a complete domain name for a specific computer device, or host, on the Internet. FQDN enables each network entity connected to the Internet to be uniquely identified and located in the network. This is useful in many ways such as, for example, to provide security, parental control and privacy services, maintenance of the network and managing subscribers to the network.

It is known to use unencrypted domain name system (DNS) queries and unencrypted server name indication (SNI) information from hypertext transfer protocol secure (HTTPS) handshakes to extract the FQDN for end users. However, in case DNS queries and SNI portion of the HTTPS handshake are encrypted, then the possibility to extract FQDN directly from the HTTPS handshake becomes impossible and service providers are not able to understand what FQDN is being accessed over the Internet by intercepting and inspecting DNS traffic.

Thus, there are needs for alternative, accurate methods to track end user FQDNs.

Figure 1:
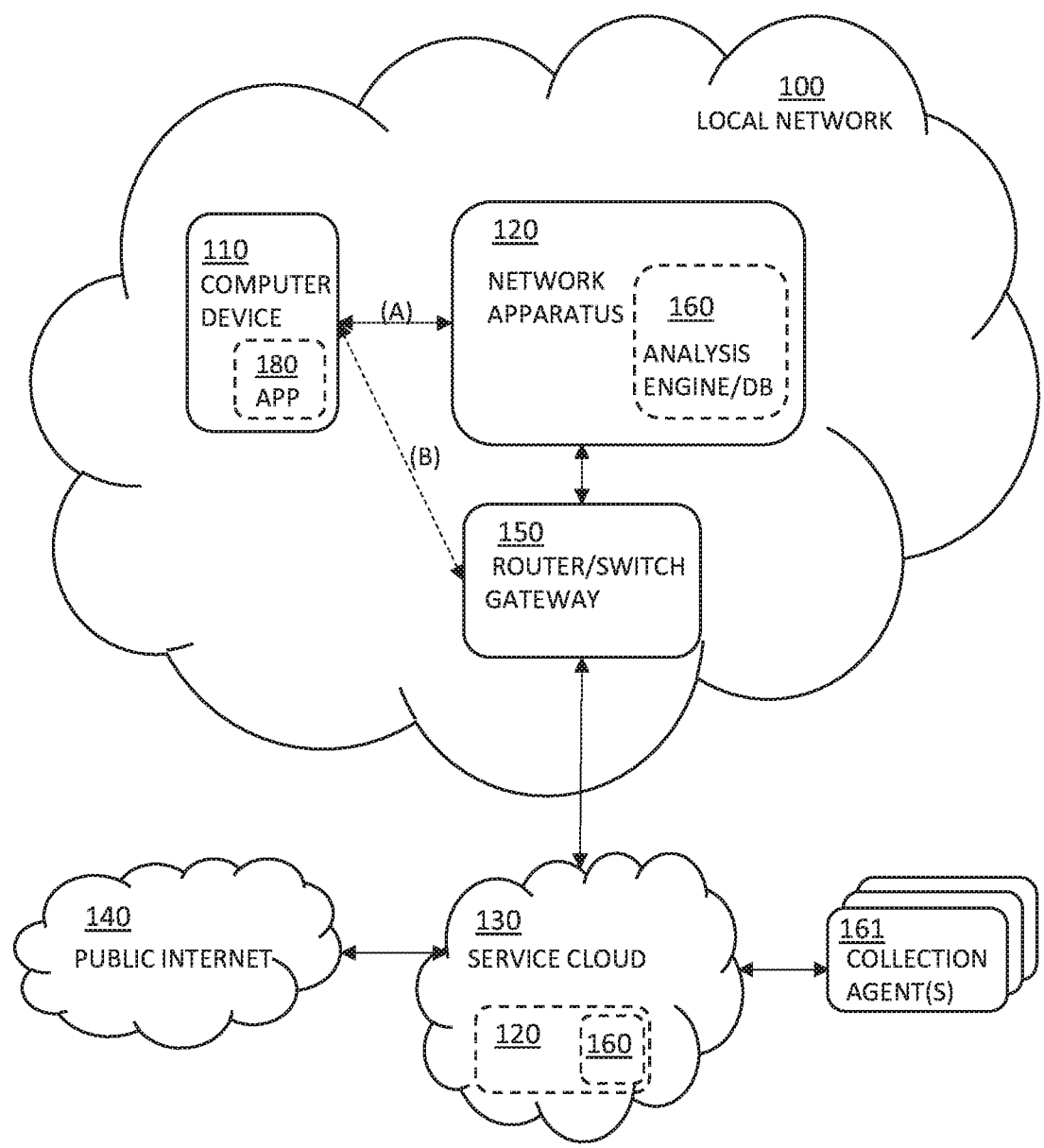
FIG. 1 illustrates an example system environment for a network apparatus in a computer network system.

FIG. 1 illustrates schematically an example of a system environment for a network apparatus 120. The system environment illustrated in FIG. 1 includes a local network 100 that may include one or more devices 110 with a client application 180, the network apparatus 120, a local router/switch 150, and an analysis engine 160. The example system also includes a service cloud 130, such as a network operator's cloud, the Internet 140, and a plurality of data collection agents 161. The analysis engine 160 may reside in the local network, in the service cloud 130 or elsewhere in the network. There may also be more than one analysis engines 160 thus enabling at least part of the analysis being processed in more than one analysis engines. The data collection agents 161 may reside anywhere in the network and may communicate directly or non-directly with the service cloud 130, apparatus 120 and/or the analysis engine/database 160 or be part of any other entity in the network. A collection agent 161 can be any apparatus/device capable of collecting data related to one or more devices 110. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

In an embodiment, the device 110 may communicate (A) via the network apparatus 120 residing in the local network 100. In another embodiment, the device 110 may communicate (B) directly via a network gateway or a modem 150, for example when the device is not in the local network 100. In an embodiment, the network operators may deploy a service platform on their broadband gateways 150 provided to customers and in their own cloud environments 130. The user device(s) 110 may also be configured to use the services provided by the service cloud 130 by one or more applications 180 installed on the device(s) 110.

The device 110 may be any computer device having Internet browsing capabilities, such a smartphone, laptop or a tablet. The network apparatus 120 collects information e.g. about the local network 100, including data about the network traffic through the local network 100 and data identifying devices in the local network 100, such as any smart appliances and user devices 110. The network apparatus 120 is configured to receive traffic control instructions from the analysis engine 160 and to process network traffic based on the traffic control instructions. Processing the network traffic through the local network 100, for example, can include restricting where network traffic can travel, blocking network traffic from entering the local network 100, redirecting a copy of network traffic packet or features of those packets to the analysis engine 160 for analysis (e.g., for malicious behaviour), or quarantining the network traffic to be reviewed by a user (e.g., via the user device 110) or network administrator. In some embodiments, the functionality of the network apparatus 120 is performed by a device that is a part of the local network 100, while in other embodiments, the functionality of the network apparatus 120 is performed by a device outside of the local network 100.

The network apparatus 120 may be configured to monitor traffic that travels through the local network 100. In some embodiments, the network apparatus 120 can be a device that is a part of the local network 100. The network apparatus 120 can be connected to the local network 100 using a wired connection (e.g. via en Ethernet cable connected to a router) or using a wireless connection (e.g. via a Wi-Fi connection). In some embodiments, the network apparatus 120 can comprise multiple devices. In some embodiments, the network apparatus 120 can also perform the functions of the local network router 150 for the local network 100.

In some embodiments, the network apparatus 120 may intercept traffic in the local network 100 by signalling to the user device 110 that the network apparatus 120 is router 150. In some embodiments, the network apparatus 120 replaces the default gateway or gateway address of the local network 100 with its own internet address. In some embodiments, the local network 100 can be structured such that all network traffic passes through the network apparatus 120, allowing the network apparatus 120 to physically intercept the network traffic. For example, the network apparatus 120 can serve as a bridge through which all network traffic must travel to reach the router 150 of the local network 100.

The analysis engine 160 may receive and analyze network traffic data (e.g., forwarded by the collection agents(s) 161 and/or the network apparatus 120) associated with devices on the computer network. The analysis engine 160 may be implemented within a remote system (e.g., a cloud server) or within the local network 100. The analysis engine 160 may perform operations that are computationally expensive for the network apparatus 120 to perform. In some embodiments, the analysis engine 160 replaces the network apparatus 120 by performing the functionalities of the network apparatus 120. In these embodiments, the local network router 150 may be configured to forward network traffic to the analysis engine 160. In some embodiments, the analysis engine 160 communicates with other devices on the computer network. In some embodiments, the analysis engine 160 is integrated into the network apparatus 120.

The local network 100 is a local area network (LAN) that comprises the one or more devices 110, network apparatus 120, and local network router 150. The local network 100 may be used for a number of purposes, including a home network or a network used by a business. The local network 100 is connected to the internet 140, allowing devices within the local network 100, including the user device 110, to communicate with devices outside of the local network 100. The local network 100 may be a private network that may require devices to present credentials to join the network, or it may be a public network allowing any device to join. In some embodiments, other devices, like personal computers, smartphones, or tablets, may join local network 100.

The internet 140 and the local network 100 may comprise any combination of LANs and wide area networks (WANs), using both wired and wireless communication systems. In some embodiments, the internet 140 and the local network 100 use standard communications technologies and protocols. Data exchanged over the internet 140 and the local network 100 may be represented using any suitable format, such as hypertext markup language (HTML) or extensible markup language (XML). In some embodiments, all or some of the communication links of the internet 140 and the local network 100 may be encrypted using any suitable technique or techniques.

The user device 110 is a computing device capable of receiving user input as well as transmitting and/or receiving data via the Internet 140 or local network 100. In some embodiments, a user device 110 is a conventional computer system, such as a desktop or a laptop computer. Alternatively, a user device 110 may be a device having computer functionality, such as a personal digital assistant (PDA), a mobile telephone, a smartphone, or another suitable device. The user device 110 is a network device configured to communicate with the Internet 140 or local network 100. In some embodiments, the user device 110 executes an application (e.g., application 180) allowing a user of the user device 110 to interact with other network devices, such as the smart appliances, the network apparatus 120, the router 150, or the analysis engine 160. For example, the user device 110 executes a browser application to enable interaction between the user device 110 and the network apparatus 120 via the local network 100.

The client application 180 is a computer program or software application configured to run on the user device 110. For example, the application 180 is a web browser, a mobile game, an email client, or a mapping program. The user device 110 can have any number of applications 180 installed. The application 180 may communicate, via the user device 110, with devices inside and outside of the local network 100.

The embodiments of the invention enable alternative ways to determine a fully qualified domain name (FQDN) based on IP address tracking thus avoiding limitations of using encrypted server name identification. Since many FQDNs may share same IP addresses, in an embodiment, the method builds from IP tracking. Webpages being loaded first request main URLs and subsequently several requests are sent in parallel to load all resources and assets required to build the webpage. In an embodiment, the timing of these requests is considered, and a model is built that maps specific attributes, such as the FQDN, IP address, and the time from initial FQDN load. In an embodiment, a map of the Internet is built enabling mapping not only known IP address of each FQDN but also all resource IPs and timings associated with each FQDN. For example, for each IP address identified as a main URL, it is possible to determine how many possible FQDNs are mapped to respective IP address. Standard statistical or machine learning models may be used to determine the closest fit based resource IPs and resource load timing.

Figure 2:
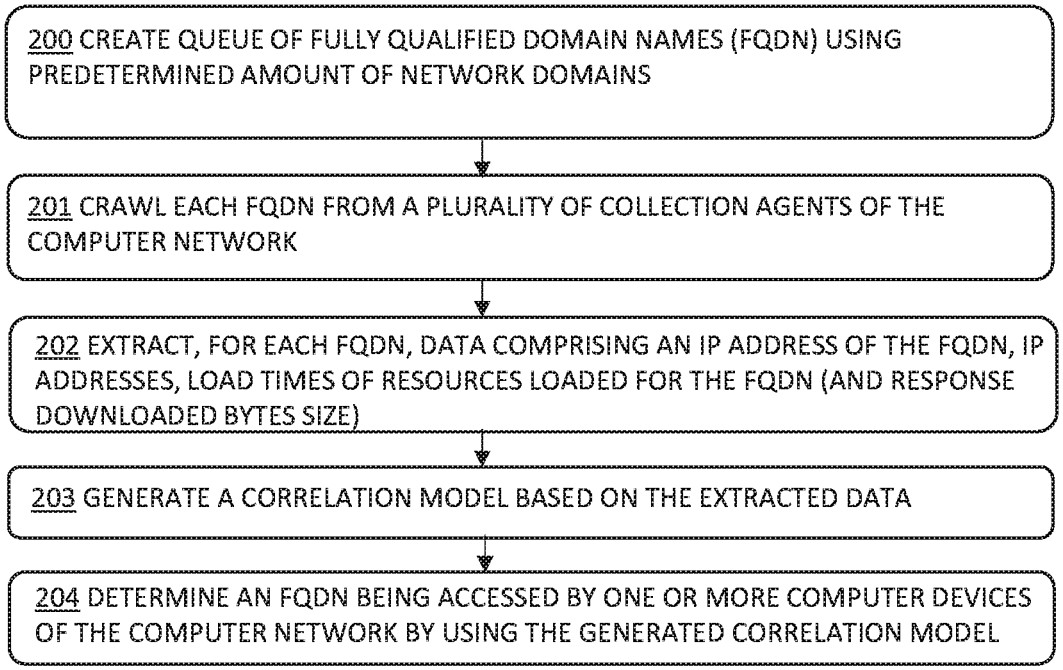
FIG. 2 illustrates a method, according to one embodiment.

FIG. 2 is a flow diagram illustrating an embodiment of a method.

In 200, a queue of fully qualified domain names (FQDN) using a predetermined amount of network domains is created.

In 201, each FQDN is crawled from a plurality of collection agents of the computer network.

In 202, for each crawled FQDN, data comprising an IP (Internet Protocol) address of the FQDN, IP addresses for resources loaded for the FQDN and load times of the resources loaded for the FQDN are extracted. In an embodiment, also response downloaded bytes size is extracted for each crawled FQDN.

In 203, a correlation model is generated based on the extracted data.

In 204, an FQDN being accessed by one or more computer devices of the computer network is determined by using the generated correlation model.

In an embodiment, the plurality of collection agents of the computer network reside in multiple physical locations globally.

In an embodiment, the plurality of collection agents of the computer network are configured to use a plurality of web browser software technologies to extract the data related to each FQDN.

In an embodiment, data of the used web browser software technologies by the plurality of collection agents and a location of each collection agent for generating the correlation model is stored.

In an embodiment, the extracted data is provided to a central database for generating the correlation model.

In an embodiment, generating the correlation model further comprises: determining a main uniform resource locator (URL) being requested for each internet protocol (IP) address based on the load times of resources loaded for each FQDN; determining all possible FQDNs mapped to each IP address determined as the main URL; and using a statistical or a machine learning model to determine the closest correlation between all possible FQDNs determined and the main URL based on the IP addresses of the resources loaded and the load times of resources for the FQDN.

In an embodiment, geolocation data of the one or more computer devices is extracted and used for generating the correlation model.

In an embodiment, generating the correlation model further comprises analyzing the order of the resources loaded based on the load times of the resources loaded for the FQDN.

In an embodiment, for each crawled FQDN, data relating to the number of downloaded bytes of the resources loaded is extracted and the extracted number of downloaded bytes is used for generating the correlation model. Thus, in an embodiment, determining the FQDN being accessed is further based on analyzing the number of downloaded bytes.

In an embodiment, the extracted data further comprises data of the number of webpage loads, the number of downloaded bytes for each webpage load and an order of the webpage loads.

In an embodiment, the amount of data sent over an active transmission control protocol (TCP) session may be used in analysis. However, this data only contains IP addresses and ports of the connections. For example, different kinds of application analysis also benefit from understanding the shape of the traffic transferred and thus, collecting statistics for a lifetime of a connection may be required. In an embodiment, said amount of data sent over a connection can be matched with protocol metadata from the connection. This data may be regularly sent to an analysis engine for aiding in model creation and for example application activity analysis. For example, when a new TCP connection is opened, various connection metadata is extracted depending on the type of protocol used (e.g. user agent from HTTP/GUIC connections or the full URL from HTTP connections). When metadata has been extracted, the connection can be marked in a userspace agent. The userspace agent periodically polls a userspace interface (e.g. conntrack utility) and the amount of packets and bytes that have been sent are extracted from the response from the userspace interface. For the duration of the connection, the metadata, length of time in the connection and amount of transmitted data can be periodically sent to an analysis engine/service cloud for analysis. The userspace agent may also subscribe to destroy an event from the interface. This means that when the connection has ended, the exact amount of packets and bytes transferred are known.

In an embodiment, accuracy of the generated correlation model is tested by comparing an FQDN determined by using a server name indication (SNI) information with the FQDN determined by using the generated correlation model; and the generated correlation model is adjusted based on the testing.

In an embodiment, further action is taken to protect the one or more computer devices from a possible security threat caused by the determined FQDNs. In an embodiment, taking further action to protect the one or more computer devices comprises one or more of: blocking or preventing access to the FQDN, providing security, parental control or privacy protection measures based on the determined FQDN.

Tracking IP Addresses

It is possible to track a specific HTTPS connection, for example, over port 443 by the destination IP address that is being accessed. A map can be generated that has a tuple of FQDN and IP address. Table 1 shows an example of a simple map.

TABLE 1

| Example map of FQDN and IP address | |
|---|---|
| FQDN A | IP Address of A |
| FQDN B | IP Address of B |
| ... | ... |
| FQDN N | IP Address of N |

However, this scheme does not work, because many FQDNs may share the same IP address. For example, in cases where content distribution networks (CDN) are used, an IP address may host hundreds and even thousands of domains. The following example embodiment describes an example method of tracking (with measured accuracy) FQDNs being visited by an end user.

Example Method—Building from IP Tracking

Let us consider the construction of a webpage being loaded. The first request loads the main URL being requested. Subsequently several further requests are sent in parallel to load all the resources and assets required to build the webpage. The main site URL, for example, may require loading of required images, CSS, JavaScript and/or requests initiated by JavaScript asynchronously (AJAX).

Also, timing of these requests is considered. A loaded webpage starts with an initial URL and is followed by a further resource loading activity. Then follows tapering off activity and finally very little activity until the end user clicks on the next webpage link. This can be depicted over time as illustrated in Table 2 example. Based on analyzing a bundle of requests (main and subrequests), number of activities creating a unique fingerprint can be detected even in 30 to 60 seconds from the start of loading since no two websites have exact same fingerprints.

TABLE 2

| Example of webpage loading activity | | | | | | | | | | | | | | | | | | |
|---|---|---|---|---|---|---|---|---|---|---|---|---|---|---|---|---|---|---|
| URL | R | R | R | R | R | ... | R | R | ... | A | A | A | Wait time | URL2 | R | R | R | R | ... | R | R | ... |

A model can now be generated that maps the following attributes shown in Table 3.

TABLE 3

Example mapping model

| FQDN or Resource | IP Address | Time from FQDN-Initial load |
|---|---|---|
| FQDN A | IP Address of FQDN A | T0 |
| Resource 1 of FQDN A | IP Address of Resource 1 | time(Resource(1))-T0 |
| Resource 2 of FQDN A | IP Address of Resource 2 | time(Resource(2))-T0 |
| Resource 3 of FQDN A | IP Address of Resource 3 | time(Resource(3))-T0 |
| Resource 4 of FQDN A | IP Address of Resource 4 | time(Resource(4))-T0 |
| ... | ... | ... |
| Resource N of FQDN A | IP Address of Resource N | time(Resource(N))-T0 |

Thus, if a map of the Internet is build using a plurality of websites, for example all websites in the Alexa top 1,000,000 or a larger data set, it is possible to map not only the known IP address of each FQDN but also all of the resource IPs and timings associated with each FQDN.

For each IP address that is identified as a main (head) URL, it can be determined how many possible FQDNs are mapped to that IP. Further, one or more standard or machine learning models can be used to determine the closest fit based on the resource IP's and resource load timing.

Considering Geolocation

In an embodiment, an association map that is generated can also include geolocation information for the source and/or end user. For example, CDNs typically use different IP addresses to route customers to the nearest CDN edge node. This is referred to as an unicast method for routing, where a DNS will determine the closest node. Some modern CDNs use the same IP address globally and rely on a route optimization known as anycast to perform routing to the nearest node. While the method of routing can often be predetermined based on "who" owns the destination IP address, a generalization can be made and source geolocation can be tracked as one dimension of analysis. In an embodiment, to overcome the geolocation challenges, the distance between the source and the end user can be triangulated.

Considering Different Browsers and Versions

Different web browsers and versions of web browsers may have slightly different resource timings. For example, some web browsers default to HTTP2.0 and make requests for many resources in parallel. This may affect timing (in a positive way from an end user perspective). Other web browsers may default to HTTP1.1 and use multi-threading for parallel resource loading. These web browsers may have different timing profiles.

Figure 3:
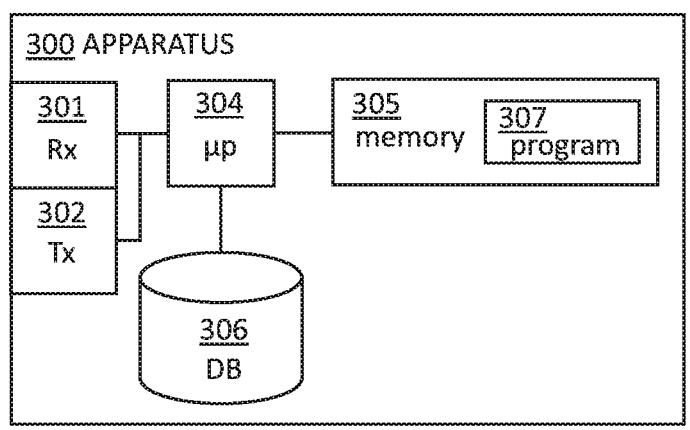
FIG. 3 is a block diagram of an apparatus, according to one embodiment.

Turning now to FIG. 3 that is showing an example of a network apparatus.

A processor 304 is provided that is configured to detect connection requests relating to monitored network traffic passing through the network apparatus. Further, the processor 304 is configured to create a queue of fully qualified domain names (FQDN) using a predetermined amount of network domains, crawl each FQDN from a plurality of collection agents of the computer network, extract, for each crawled FQDN, data comprising an IP (Internet Protocol) address of the FQDN, IP addresses for resources loaded for the FQDN and load times of the resources loaded for the FQDN, generate a correlation model based on the extracted data; and determine an FQDN being accessed by one or more computer devices of the computer network by using the generated correlation model.

In an embodiment, the processor 304 is further configured to store extracted data to the database 306. The database 306 is shown in this example as being located at the apparatus 300, but it will be appreciated that the apparatus 304 may alternatively access a remote database. The database 304 may comprise necessary data collected from user devices.

In the above description, the apparatus 300 is described as having different transmitter 302 and receiver 301. It will be appreciated that these may be disposed in any suitable manner, for example in a single transmitter and receiver, a transceiver and so on. Similarly, a single processor 304 is described but it will be appreciated that the function of the processor may be performed by a single physical processor or by more than one processor.

The apparatus 300 is also provided with a non-transitory computer readable medium in the form of a memory 305. The memory may be used to store a computer program 307 which, when executed by the processor 300, causes the processor 304 to perform the functions described above. The computer program 307 may be provided from an external source. In an embodiment, at least some or even all of the functions of the method can be implemented in any apparatus, for example the user device or a server.

Figure 4:
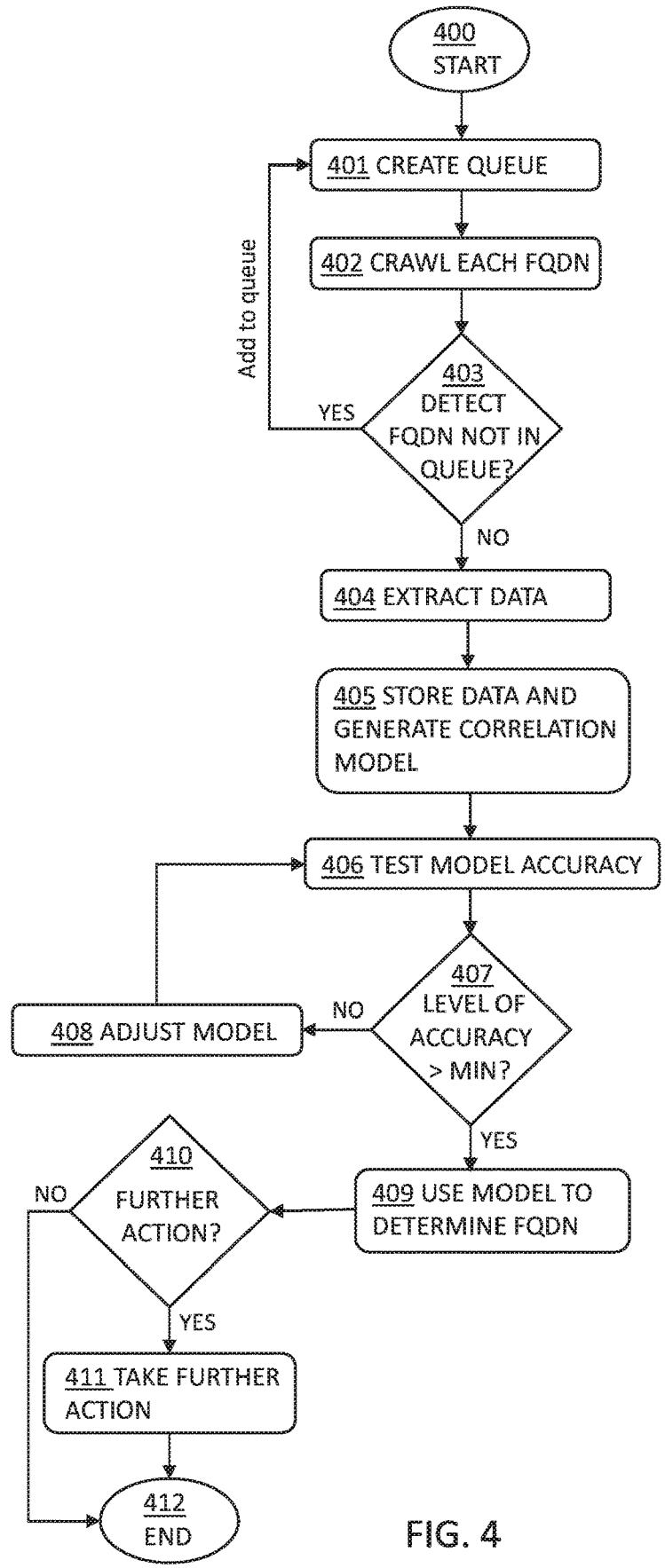
FIG. 4 is a flow diagram illustrating a process according to one embodiment.

Let us turn to FIG. 4 flow diagram illustrating a process, according to one embodiment.

The process starts in 400. In 401, a queue of FQDNs is created. In an embodiment, this can be done, for example, based on a list of most popular websites known, but any other list or database or plurality of lists/databases of websites can be used.

In 402, each FQDN is crawled from multiple collection points globally. In an embodiment, a plurality of collection agents running in various geographical locations are used to collect crawling data related to the FQDNs. In an embodiment, plurality of web browsing software technologies are used by each collection agent to collect the data relating to each FQDN.

In 403, in response to detecting an FQDN through crawling that is not part of the initial FQDN queue, the detected FQDN is added to the queue for processing.

In 404, data is extracted for each FQDN. The data comprises, for example, a browser/version, allocation, an IP address of the FQDN, resources loaded for the FQDN, timing of resourced loaded for the FQDN, and bytes of transferred network packets and their directions for each FQDN.

In 405, the extracted data is sent to an analysis engine for processing and/or for storing in a database. Once a predetermined amount of data has been collected, a correlation model is generated. The correlation model may be a statistical or a machine learning model that is able to correlate a source location, source web browser, FQDN IP, resource IP, resource timing and/or resource bytes transferred per direction for each FQDN.

In 406, the accuracy of the generated correlation model is tested. In response to detecting the level of accuracy of the correlation model being below a predetermined threshold (407), 408 is entered where the correlation model is adjusted accordingly.

In 409, an FQDN related to any IP address that is detected to be connected by a user device can be determined based on the generated correlation model.

In 410, in response to determining that further action should be taken on the basis of the determined FQDN, then 411 is entered. The process ends in 412.

In example embodiments, the method can perform one or more of the following functions:
Creating a queue of FQDNs, for example, starting with Alexa Top 1,000,000 domains.
Crawling each FSDN from multiple collection points globally (e.g. from agents running from many places around the world to collect crawling information) and using plurality of browser software technologies by each collection point to collect information relating to each FQDN.
Recording for each FQDN one or more of: a browser/version, a location, an IP address of the FQDN, all resources loaded for the FQDN, all timing of resourced loaded for the FQDN, and bytes of transferred network packets and their directions for each FQDN.
Returning a tuple of information back to a central database for processing.
Building a statistical or a machine learning model to correlate, for each FQDN, a source location, source browser, FQDN IP, resource IPs, resource timing, resource bytes transferred per direction.
In response to discovering an FQDN through crawling that is not part of the initial FQDN queue, adding the discovered FQDN to the queue for processing.

In example embodiments and once the database and correlation models are built, any IP address that is being connected to from an end user device can be classified in near real-time. In example embodiments, the method can perform one or more of the following functions:
Determining, based on timing, whether a destination IP address is the main/parent FQDN or a child resource being loaded.
Collecting the source IP address of the end user and mapping the source IP to a geolocation based on standard known geo-IP maps.
Collecting the potential browser being used by the end user based on device ID characteristics. This data point can be used to strengthen the model if known.
Collecting the subsequent resource IPs and timing.
Requesting the correlation model for the FQDN most likely to be accessed based on source location, source browser, FQDN IP, resource IPs and/or resource timing.

In an embodiment, the detection method described herein relies on traffic patterns that can uniquely identify specific webpages. It should be noted, however, that the first page of a FQDN may have different amount of text, images, image sizes, embedded scripts, styles, and the like from each subsequent webpage loaded or accessed from a webpage within the FQDN.

Thus, while a model can be trained to identify a FQDN based on bytes transferred and other traffic data from an initial page load, the model can be further trained on data representative of bytes transferred and/or other traffic data for subsequent webpage loads as well. In some embodiments, a threshold number of webpage loads are tracked, for example 100, 500, 1000 or more, within each FQDN. This includes the bytes transferred for each webpage load and an order of webpage loads (e.g. the order in which webpages may be navigated from an initial webpage of an FQDN). By training the model on additional signals provided by the subsequent webpage load data, the model can be made more robust and more accurate FQDN identification is enabled.

In an embodiment, testing of the generated model/algorithm can be made by using an adoption curve. The accuracy of the classifier can be tested in real time, for example, by comparing a known SNI result with the classifier result after feeding the classifier features stated above, such as a source location, source web browser, FQDN IP, resource IPs and resource timing.

Machine learning, rules and/or other machine learning models may here be utilized for the correlation model. The nature of the model used by the system may be, or may incorporate elements, from one or more of the following: a neural network trained using a training data set, exact or heuristic rules (e.g. hardcoded logic), fuzzy logic based modelling, and statistical modelling. The model may be trained to consider particular patterns, data, processes, connections, and dependencies between processes.

It will be appreciated that various modifications may be made to the above described embodiments without departing from the scope of the present invention. For example, the database or analysis engine may be in separate entities to the apparatus, in which case the apparatus will send queries remotely to the analysis engine.

The steps, signalling messages and related functions described above in relation to the figures are in no absolute chronological order, and some of the steps may be performed simultaneously or in a different order. Other functions may also be executed between the steps and other signalling may be sent between the illustrated ones. Some of the steps can also be left out or replaced by a corresponding step. The system functions illustrate a procedure that may be implemented in one or more physical or logical entities.

The techniques described herein can be implemented by various means. An apparatus or system that implements one or more of the described functions may comprise not only existing means but also means for implementing one or more functions of a corresponding apparatus that is described with an embodiment. An apparatus or a system may also comprise separate means for each separate function. For example, the embodiments may be implemented in one or more modules of hardware or combinations thereof. For software, implementation can be through modules, for example such procedures and functions that perform the functions described. The software code may be stored in any suitable data storage medium that is readable by processors, computers, memory units or articles of manufacture, and may be executed by one or more processors or computers. The data storage medium or memory unit or database may be implemented within the processor or computer apparatus, or as an external part of the processor or computer apparatus.

The programming, such as executable code or instructions, electronic data, databases or other digital information may be stored into memories and can include a processor-usable medium embodied in any computer program product which can contain, store, or maintain programming, data or digital information for use by or in connection with an instruction execution system, such as the processor.

An embodiment provides a non-transitory computer-readable medium comprising stored program code comprised of computer-executable instructions. The computer program code comprises a code for creating a queue of fully qualified domain names (FQDN) using a predetermined amount of network domains, a code for crawling each FQDN from a plurality of collection agents of the computer network, a code for extracting, for each crawled FQDN, data comprising an IP (Internet Protocol) address of the FQDN, IP addresses for resources loaded for the FQDN and load times of the resources loaded for the FQDN, a code for generating a correlation model based on the extracted data; and a code for determining an FQDN being accessed by one or more computer devices of the computer network by using the generated correlation model.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
    creating a queue of fully qualified domain names (FQDNs) using a predetermined amount of network domains;
    crawling, by each collection agent of a plurality of collection agents of a computer network, each FQDN;
    extracting, for each FQDN, data comprising an Internet Protocol (IP) address of the FQDN, IP addresses for resources loaded for the FQDN and load times of the resources loaded for the FQDN;
    generating a correlation model based on the data by determining a main URL being requested for each IP address based on the load times of the resources loaded for each FQDN, determining all FQDNs mapped to each IP address determined as the main URL, and determining a closest correlation between FQDNs and the main URL based on the IP addresses for the resources loaded and the load times of the resources for each FQDN; and
    determining, based at least in part on the correlation model, an FQDN being accessed by one or more computer devices of the computer network.

2. The method according to claim 1, wherein the plurality of collection agents of the computer network reside in multiple physical locations globally.

3. The method according to claim 1, wherein the plurality of collection agents of the computer network are configured to use a plurality of web browser software technologies to extract the data comprising the IP address of the FQDN, the IP addresses for the resources loaded for the FQDN, and load times of the resources loaded for the FQDN.

4. The method according to claim 3, further comprising storing data of the plurality of web browser software technologies used by the plurality of collection agents and a location of each collection agent, and the step of generating the correlation model is further based on data that identifies particular web browser software technologies used by the plurality of collection agents and the location of each collection agent.

5. The method according to claim 1, further comprising providing the data to a central database.

6. The method according to claim 1, wherein generating the correlation model further comprises:
    determining a main uniform resource locator (URL) being requested for each IP address based on the load times of the resources loaded for each FQDN;
    determining all FQDNs mapped to each IP address determined as the main URL; and
    using a statistical model or a machine learning model to determine the closest correlation between the FQDNs and the main URL based on the IP addresses for the resources loaded and the load times of the resources for each FQDN.

7. The method according to claim 1, further comprising extracting geolocation data of the one or more computer devices, and the step of generating the correlation model is further based on the geolocation data of the one or more computer devices.

8. The method according to claim 1, wherein generating the correlation model further comprises analyzing an order of the resources loaded for the FQDN based on the load times of the resources loaded for the FQDN.

9. The method according to claim 1, further comprising extracting, for each FQDN, data relating to a number of downloaded bytes of the resources loaded, and using the number of downloaded bytes for generating the correlation model, wherein determining the FQDN being accessed is further based on analyzing the number of downloaded bytes.

10. The method according to claim 1, wherein the data further comprises data of a number of webpage loads, a number of downloaded bytes for each webpage load, and an order of the webpage loads.

11. The method according to claim 1, further comprising: prior to determining the FQDN being accessed by the one or more computer devices of the computer network, testing accuracy of the correlation model by comparing an FQDN determined by using server name indication (SNI) information of the FQDN being accessed with an FQDN determined by using the correlation model; and adjusting the correlation model based on the testing.

12. The method according to claim 1, further comprising taking further action to protect the one or more computer devices from a possible security threat caused by the FQDN being accessed by the one or more computer devices.

13. The method according to claim 12, wherein taking further action to protect the one or more computer devices comprises one or more of: blocking or preventing access to the FQDN determined based at least in part on the correlation model, providing security, parental control, or privacy protection measures based on the FQDN determined based at least in part on the correlation model.

14. A system comprising:
one or more processors; and
a non-transitory computer-readable medium comprising stored program code, the program code comprising computer-executable instructions that, when executed by the one or more processors, cause the one or more processors to:
create a queue of fully qualified domain names (FQDN) using a predetermined amount of network domains;
crawl, by each collection agent of a plurality of collection agents of a computer network, each FQDN;
extract, for each FQDN, data comprising an Internet Protocol (IP) address of the FQDN, IP addresses for resources loaded for the FQDN and load times of the resources loaded for the FQDN;
generate a correlation model based on the data by determining a main URL being requested for each IP address based on the load times of the resources loaded for each FQDN, determining all FQDNs mapped to each IP address determined as the main URL, and determining a closest correlation between FQDNs and the main URL based on the IP addresses for the resources loaded and the load times of the resources for each FQDN; and
determine, based at least in part on the correlation model, an FQDN being accessed by one or more computer devices of the computer network.

15. The system according to claim 14, wherein the plurality of collection agents of the computer network reside in multiple physical location globally and are configured to use a plurality of web browser software technologies to extract the data comprising the IP address of the FQDN, the IP addresses for the resources loaded for the FQDN, and load times of the resources loaded for the FQDN.

16. The system according to claim 14, wherein the instructions further cause the one or more processors to: determine a main uniform resource locator (URL) being requested for each IP address based on the load times of the resources loaded for each FQDN; determine all FQDNs mapped to each IP address determined as the main URL; and use a statistical model or a machine learning model to determine the closest correlation between the FQDNs and the main URL based on the IP addresses for the resources loaded and the load times of the resources for each FQDN.

17. The system according to claim 14, wherein the data further comprises one or more of: data of a number of webpage loads, a number of downloaded bytes for each webpage load, an order of the webpage loads, and geolocation data of the one or more computer devices.

18. The system according to claim 14, wherein the instructions further cause the one or more processors to extract, for each FQDN, data relating to a number of downloaded bytes of the resources loaded, and to use the number of downloaded bytes for generating the correlation model, and wherein determining the FQDN being accessed is further based on analyzing the number of downloaded bytes.

19. The system according to claim 14, wherein the instructions further cause the one or more processors to, prior to determining the FQDN being accessed by the one or more computer devices of the computer network: test accuracy of the correlation model by comparing an FQDN determined using server name indication (SNI) information of the FQDN being accessed with an FQDN determined by using the correlation model; and adjust the correlation model based on the testing.

20. A non-transitory computer-readable medium comprising stored program code, the program code comprised of computer-executable instructions that, when executed by one or more processors, cause the one or more processors to:
create a queue of fully qualified domain names (FQDN) using a predetermined amount of network domains;
crawl, by each collection agent of a plurality of collection agents of a computer network, each FQDN;
extract, for each FQDN, data comprising an Internet Protocol (IP) address of the FQDN, IP addresses for resources loaded for the FQDN and load times of the resources loaded for the FQDN;
generate a correlation model based on the data by determining a main URL being requested for each IP address based on the load times of the resources loaded for each FQDN, determining all FQDNs mapped to each IP address determined as the main URL, and determining a closest correlation between FQDNs and the main URL based on the IP addresses for the resources loaded and the load times of the resources for each FQDN; and
determine, based at least in part on the correlation model, an FQDN being accessed by one or more computer devices of the computer network.

* * * * *